US008750829B2

(12) United States Patent
Drevon et al.

(10) Patent No.: US 8,750,829 B2
(45) Date of Patent: Jun. 10, 2014

(54) METHOD FOR INTERFACING A FEMTO-CELL EQUIPMENT WITH A MOBILE CORE NETWORK

(75) Inventors: Nicolas Drevon, Paris (FR); Didier Feron, La Chapelle sur Erdre (FR); Jean-Pierre Monchanin, Saintnazaire (FR)

(73) Assignee: Alcatel Lucent, Paris (FR)

( * ) Notice: Subject to any disclaimer, the term of this patent is extended or adjusted under 35 U.S.C. 154(b) by 1063 days.

(21) Appl. No.: 12/103,500

(22) Filed: Apr. 15, 2008

(65) Prior Publication Data

US 2008/0261563 A1    Oct. 23, 2008

(30) Foreign Application Priority Data

Apr. 17, 2007    (EP) ..................... 07290476

(51) Int. Cl.
*H04M 1/66*    (2006.01)
(52) U.S. Cl.
USPC ....................... 455/411; 455/435.1
(58) Field of Classification Search
USPC ....................... 455/411, 436, 435.1
See application file for complete search history.

(56) References Cited

U.S. PATENT DOCUMENTS

| | | | | |
|---|---|---|---|---|
| 2006/0116125 | A1* | 6/2006 | Buckley et al. | 455/435.1 |
| 2007/0188298 | A1* | 8/2007 | Tariq et al. | 340/5.8 |
| 2007/0243872 | A1* | 10/2007 | Gallagher et al. | 455/436 |
| 2007/0287459 | A1* | 12/2007 | Diachina et al. | 455/436 |
| 2008/0089272 | A1* | 4/2008 | Ahokangas | 370/328 |
| 2008/0132239 | A1* | 6/2008 | Khetawat et al. | 455/436 |
| 2008/0207170 | A1* | 8/2008 | Khetawat et al. | 455/411 |
| 2008/0254833 | A1* | 10/2008 | Keevill et al. | 455/558 |
| 2008/0318571 | A1* | 12/2008 | Vikberg et al. | 455/435.2 |
| 2009/0190550 | A1* | 7/2009 | Giustina et al. | 370/331 |

FOREIGN PATENT DOCUMENTS

WO    WO2007040451 A1    4/2007

OTHER PUBLICATIONS

"Digital cellular telecommunications system (Phase 2+)", ETSI Standards, European Telecommunications Standards Institute, Sophia-Antipo, France, vol. 3-G1, No. V670, Juenn 2006, XP014035781.

* cited by examiner

*Primary Examiner* — Erika A Washington
(74) *Attorney, Agent, or Firm* — Harness, Dickey & Pierce, P.L.C.

(57) ABSTRACT

One object of the present invention is a method for interfacing a Femto-Cell equipment with a Mobile Core Network, said method comprising:
authenticating and registering said Femto-Cell equipment to a Generic Access Network Controller via a standard Up interface, the authenticating and registering further including the establishment of a secure tunnel between the said Femto-Cell equipment and a Security Gateway of said Generic Access Network Controller;
connecting at least one Mobile Network entity of said Femto-Cell equipment to at least one Mobile Core Network node with at least one standard Mobile Network interface, via a Femto Core Network Gateway entity, said at least one standard Mobile Network interface being encapsulated in a secure tunnel established between said Femto-Cell equipment and said Security Gateway of said Generic Access Network Controller, and being relayed by said Femto Core Network Gateway entity to said Mobile Core Network node.

22 Claims, 4 Drawing Sheets

FIG_3  PRIOR ART
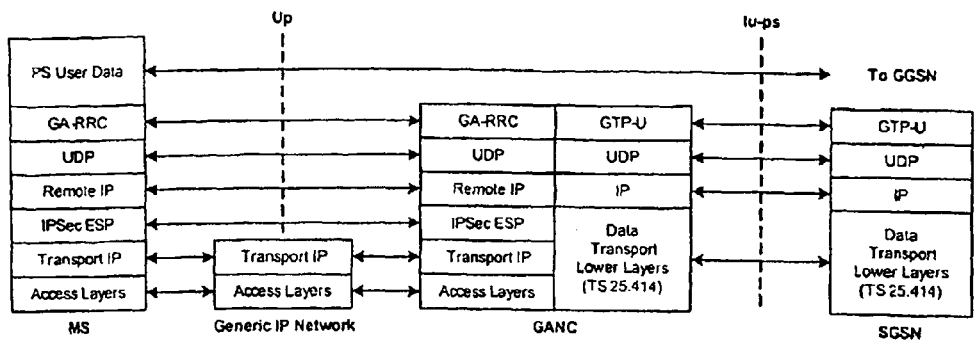
FIG_4
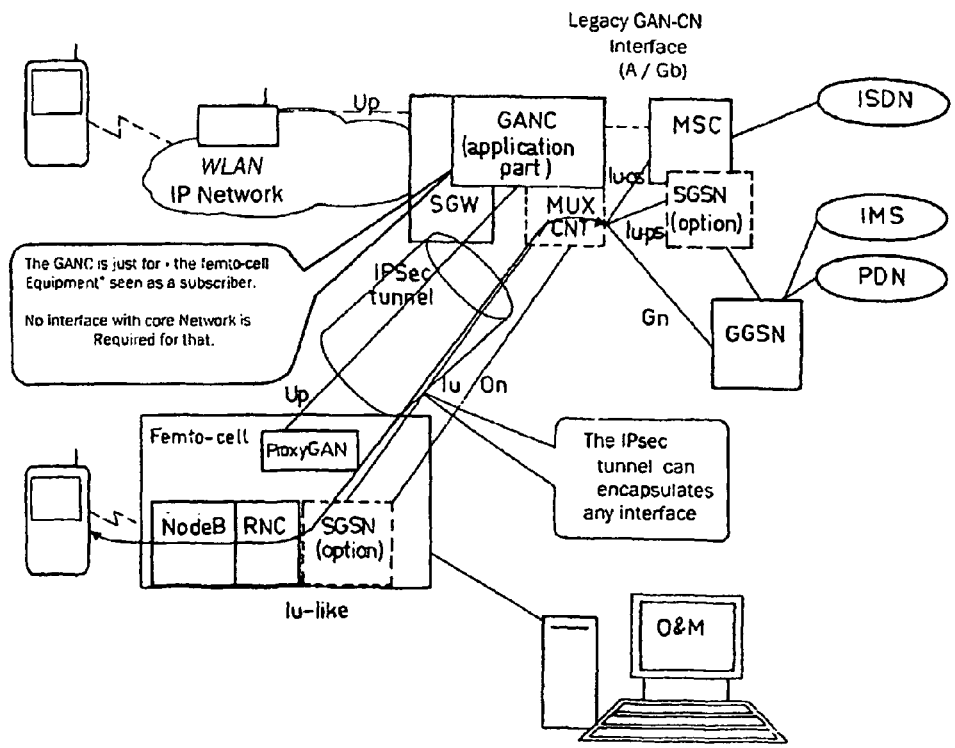

FIG_5
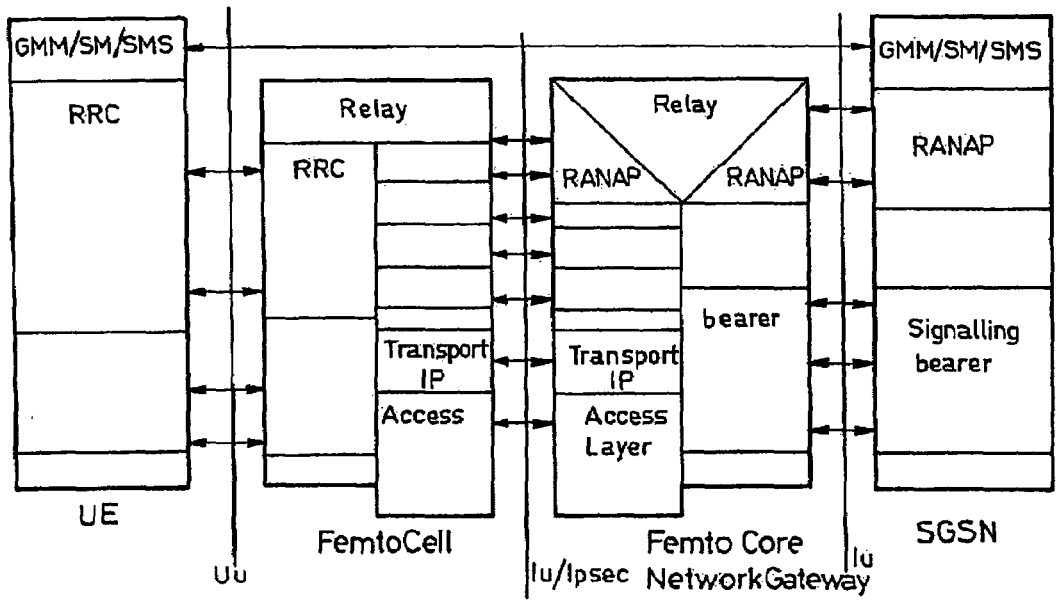
FIG_6
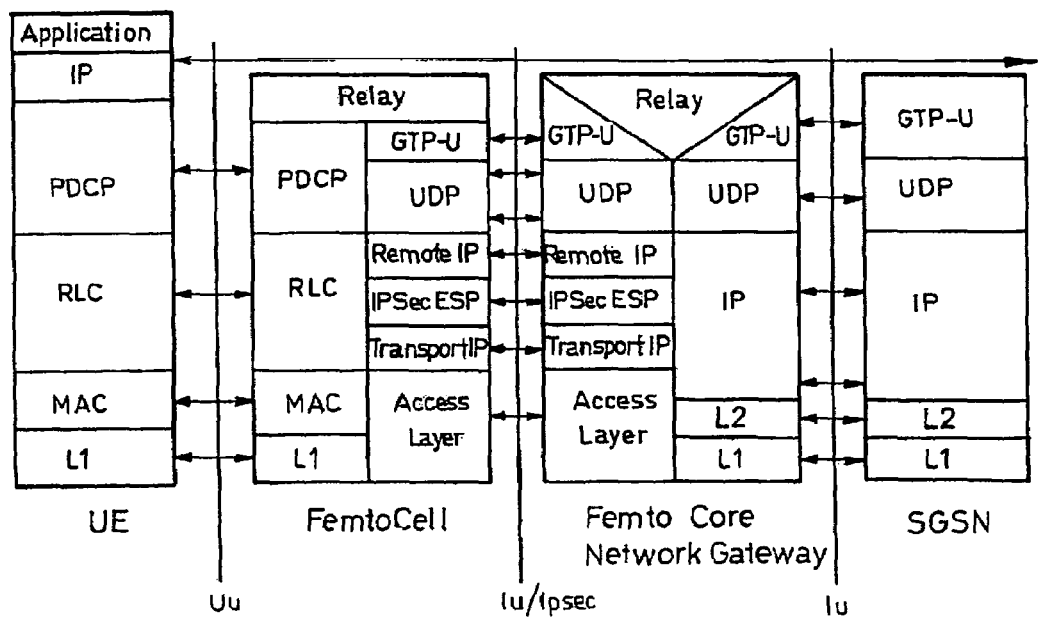

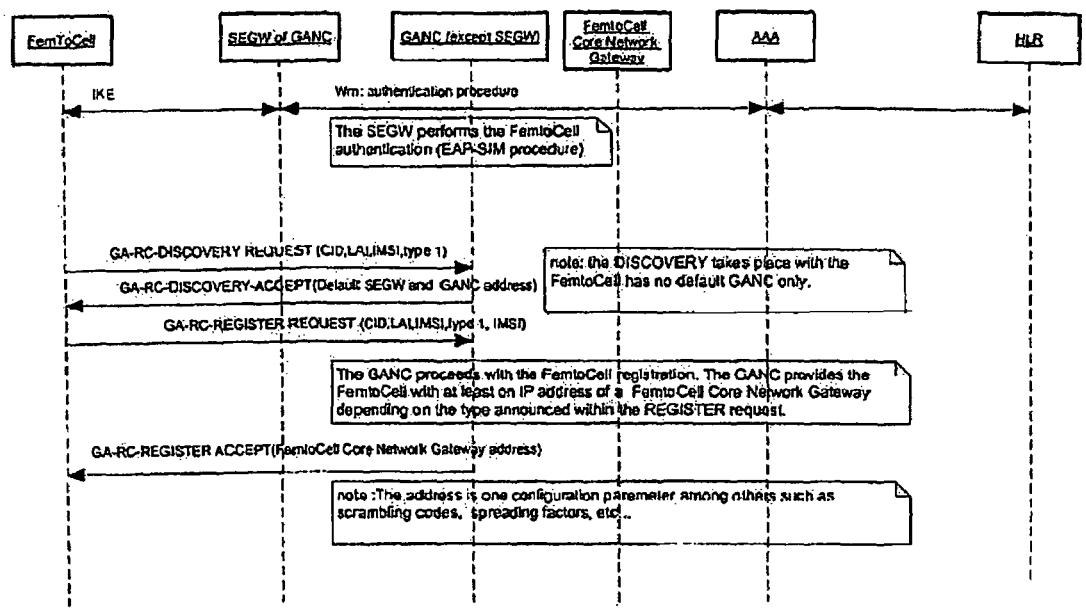
FIG_7 and the priority of which is hereby claimed under 35 U.S.C. §119.

METHOD FOR INTERFACING A FEMTO-CELL EQUIPMENT WITH A MOBILE CORE NETWORK

CROSS-REFERENCE TO RELATED APPLICATIONS

This application is based on European Patent Application No. 07290476.6 filed Apr. 17, 2007, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication networks and systems.

Detailed descriptions of mobile communication networks and systems can be found in the literature, in particular in Technical Specifications published by standardisation bodies such as in particular 3GPP ($3^{rd}$ Generation Partnership Project).

2. Description of the Prior Art

In a mobile communication system, a Mobile Station (MS) or User Equipment (UE) has access to mobile services offered by a Core Network (CN) via an Access Network (AN).

Typical examples of mobile communication systems are 2G systems such as in particular GSM (Global System for Mobile communications) and 3G systems such as in particular UMTS (Universal Mobile Telecommunication System).

There are different types of mobile services such as in particular CS based services (where CS stands for Circuit Switched), PS based services (where PS stands for Packet Switched), or IP based services (where IP stands for Internet Protocol) such as for example IMS based services (where IMS stands for IP Multimedia Subsystem). Mobile services are offered by a Core Network (CN) therefore comprising different domains and subsystems such as in particular CS domain, PS domain, and IMS subsystem.

Mobile services have traditionally been delivered to Mobile Stations via an Access Network corresponding to a Radio Access Network RAN, allowing relatively high mobility but at relatively high cost for the users.

Typical examples of RAN are GERAN (GSM/EDGE Radio Access Network, where EDGE stands for Enhanced Data rates for GSM Evolution) and UTRAN (UMTS Terrestrial Radio Access Network).

Now, there is an evolution towards Fixed Mobile Convergence, allowing mobile services to be delivered to users at lower cost in environments requiring lower mobility, such as in particular indoor environments.

For Fixed Mobile Convergence with services provided by a Mobile Core Network, two main technologies compete each other: UMA/GA technology based on WiFi/Bluetooth access points, and 3G femto-cells i.e. 3G cells whose coverage is adapted to residential market. Both use access points/cells that are connected through DSL/Broadband lines and Public Internet.

A description of UMA/GA (Unlicensed Mobile Access/Generic Access) technology can be found in particular in UMA/3GPP specifications.

Generic Access to the A/Gb interfaces (i.e. standardized interfaces defined for GERAN A/Gb mode) also called "A/Gb mode" Generic Access, is specified in particular in 3GPP TS 43.318 and TS 44.318.

Generic Access to the Iu interface (i.e. standardized interface defined for UTRAN) also called "Iu mode" Generic Access, is disclosed in particular in 3GPP TR 43.902 (Enhanced Generic Access Network Controllers Study (EGAN)).

Generic Access to the Iu interface ("Iu mode GAN") is an extension of UMTS mobile services that is achieved by tunnelling Non Access Stratum (NAS) protocols between the user equipment (MS) and the Core Network over an IP network. Iu-mode GAN is a complement to traditional GSM/GPRS/UMTS radio access network coverage.

Iu mode GAN architecture as disclosed in 3GPP TR 43.902 is briefly recalled, in relation with FIG. 1.

GAN architecture includes a Generic Access Network Controller GANC. The functionality of GANC defined for A/Gb mode GA is expanded so as to appear to the CN as a UTRAN Radio Network Controller (RNC). As for A/Gb mode GA, the GANC includes a Security Gateway (SEGW) that terminates secure remote access tunnels from the MS, providing mutual authentication, encryption and data integrity for signalling, voice and data traffic.

A Generic IP Access network provides connectivity between the MS and the GANC. The IP transport connection extends from the GANC to the MS. A single interface, the Up interface, is defined between the GANC and the MS. Functionality is added to this interface, over that defined for A/Gb GA mode, to support the Iu-mode GAN service.

The GANC is interconnected with the CN via the standardized interfaces defined for UTRAN, including in particular Iu-cs interface for CS services as defined in 3GPP TS 25.410, and Iu-ps interface for PS services as defined in 3GPP TS 25.410.

Transaction control (e.g. CC, SM) and user services are provided by the Core Network (e.g. MSC/VLR and the SGSN/GGSN).

Control and User Plane GAN architecture for CS and PS domain are specified in 3GPP TR 43.902. For example PS domain Control Plane GAN architecture is recalled in FIG. 2, and PS domain User Plane GAN architecture is recalled in FIG. 3.

The main features of the GAN PS domain control plane architecture are as follows:
- The underlying Access Layers and Transport IP layer provides the generic connectivity between the MS and the GANC.
- The IPsec layer provides encryption and data integrity.
- TCP provides reliable transport for the GA-RRC between MS and GANC.
- The GA-RC manages the IP connection, including the GAN registration procedures.
- The Generic Access Radio Resource Control (GA-RRC) protocol performs functionality equivalent to the UTRAN RRC protocol, using the underlying Up session managed by the GA-RC. Note that GA-RRC includes both CS service and PS service-related signaling messages.
- The GANC terminates the GA-RRC protocol and interworks it to the RANAP protocol over the Iu-ps interface.
- NAS protocols, such as for GMM, SM and SMS, are carried transparently between the MS and SGSN.
- The Iu-ps signalling transport layer options (both ATM and IP-based) are defined in 25.412.

The main features of the GAN PS domain user plane architecture are as follows:
- The underlying Access Layers and Transport IP layer provides the generic connectivity between the MS and the GANC.
- The IPsec layer provides encryption and data integrity.

The GA-RRC protocol operates between the MS to the GANC transporting the upper layer payload (i.e. user plane data) across the Up interface.

PS user data is carried transparently between the MS and CN.

The GANC terminates the GA-RRC protocol and interworks it to the Iu-ps interface using GTP-U.

Both UMA/GA and femto-cell technologies require security on the air and over the Public Internet. Both technologies consist in radio access networks (and possibly more) that are connected to a Core Network.

A solution where a common GANC can be reused for femto-cells technology and UMA/GA technology is disclosed in Kineto white paper entitled "The Case for UMA-Enabled Femtocells".

In this solution, the GANC is connected to the Core Network via Iu-cs and Iu-ps interfaces. Moreover, the femto-cell equipment is connected to the GANC via a modified Up interface, which is the "air interface" of the "Iu-GAN Enhanced GAN" solution described in 3GPP TR 43.902 v1.1.0. The femto-cell equipment performs the termination of UMTS Uu interface, MAC, RLC, RRC and PDCP layers as well as emulating a GAN client interfaced via modified Up.

In terms of security, both UMA/GA and UMTS femto-cells technologies require security on the air and over the Public Internet.

In UMA (GAN), the user is authenticated via a terminal-network procedure and security is achieved via an IPsec tunnel between the terminal and the GANC Security Gateway, the Wifi/Bluetooth access point acting as a simple relay.

In 3G femto-cells, the air interface is a legacy UMTS interface and the ciphering function is in the RNC function (RLC layer). In solutions where the RNC function is located in the femto-cell equipment, the air interface is ciphered but the femto-cell/network path must also be ciphered.

For that purpose, the femto-cell equipment must be authenticated to guarantee a safe connection to the terminals. The solution consists in considering the femto-cell equipment as a GAN subscriber: the femto-cell equipment includes a SIM/USIM for authentication and operates as IPsec termination for ciphering Up interface that is carried over the Public Internet.

Finally, the appropriate GANC node is "discovered" via legacy UMA (GAN) procedures. This mechanism allows to minimize the Mobility Management signaling in the Core Network and to perform load-sharing among GANC nodes.

SUMMARY OF THE INVENTION

As recognized by the present invention, such solution raises several problems or has several drawbacks, in particular:

First, the modified Up interface, described in TR 43.902 is not actually adapted for interfacing femto-cell and GANC; in particular:

there is no Up message carrying UMTS ciphering keys, which are needed at the femto-cell equipment for Uu ciphering;

there is no Up message carrying resource allocation requests to the femto-cell at incoming handover;

the RANAP Common ID message that is used to provide the terminal IMSI to the RNC in UMTS has no correspondence in the modified Up interface.

Second, the femto-cell functions are restricted to NodeB and RNC functions. For example, it is not possible to use this solution with a femto-cell equipment that includes NodeB, RNC, SGSN and GGSN functions as it will generally be the case with a full-IMS architecture where the femto-cell equipment may be directly connected to IMS via Gi interface. In other words, this solution is not flexible enough to cope with the various femto-cell architectures.

It is an object of the present invention to solve part or all of such problems, or to avoid part or all of such drawbacks. Moreover, the present invention allows to use a common GANC for GAN cells and femto-cells with legacy GAN standard as specified in 3GPP TS 43.318: an "Iu mode" enhanced GAN as described in TR 43.902 is not required although it can apply to it as well. More generally, it is an object of the present invention to improve Fixed Mobile Convergence technologies.

These and other objects are achieved, in one aspect of the present invention, by a method for interfacing a Femto-Cell equipment with a Mobile Core Network, said method comprising a step of:

connecting at least one Mobile Network entity of said Femto-Cell equipment to at least one Mobile Core Network node with at least one standard Mobile Network interface, via a Femto Core Network Gateway entity, said at least one standard Mobile Network interface (such as Iu-cs, Iu-ps, Gn, Gi) being encapsulated in a secure tunnel established between said Femto-Cell equipment and a Security Gateway of a Generic Access Network Controller, and being relayed by said Femto Core Network Gateway entity to said Mobile Core Network node.

A method according to the present invention may comprise a step of:

establishing said secure tunnel between said Femto-Cell equipment and said Security Gateway of said Generic Access Network Controller, as a result of an authentication procedure performed between said Femto-Cell equipment and said Generic Access Network Controller.

A method according to the present invention may comprise a step of:

performing discovery and registration between said Femto-Cell equipment and said Generic Access Network Controller.

A method according to the present invention may comprise a step of:

providing, by said Generic Access Network Controller to said Femto-Cell equipment, at least one address of a Femto Core Network Gateway entity that said at least one Femto-Cell Mobile Network entity can connect to.

A method according to the present invention may comprise a step of:

providing said at least one address at the time of registering said Femto-Cell equipment with said Generic Access Network Controller.

A method according to the present invention may comprise a step of:

concentrating, in said Femto Core Network Gateway entity, a plurality of Mobile Network standard interfaces connecting a plurality of Femto-Cell Mobile Network entities to at least one Mobile Core Network node type.

A method according to the present invention may comprise a step of:

performing admission control when performing said concentrating in said Femto Core Network Gateway entity.

A method according to the present invention may comprise a step of:

provide, by said Femto-Cell equipment to said Generic Access Network Controller, information as to the type(s) of standard Mobile Network interface(s) connecting said at least one Femto-Cell Mobile Network entity to at least one Mobile Core Network node type.

A method according to the present invention may comprise a step of:

providing said information at the time of discovery and/or registration performed between said Femto Cell equipment and said Generic Access Network Controller.

A method according to the present invention may comprise a step of:

using said information when concentrating, in said Femto Core Network Gateway entity, a plurality of Mobile Network standard interfaces connecting a plurality of Femto-Cell Mobile Network entities to at least one Mobile Core Network node type.

These and other objects are achieved, in another aspect of the present invention, by various network entities, such as in particular Generic Access Network Controller GANC, Femto-Cell equipment, Femto-Cell Mobile Network entity, Femto Core Network Gateway entity, for performing a method according to the present invention.

Another aspect of the present invention is therefore a Femto Core Network Gateway entity, comprising:

means for connecting at least one Mobile Network entity of a Femto-Cell equipment to at least one Mobile Core Network node with at least one standard Mobile Network interface, via said Femto Core Network Gateway entity, said at least one standard Mobile Network interface being encapsulated in a secure tunnel established between said Femto-Cell equipment and a Security Gateway of a Generic Access Network Controller, and being relayed by said Femto Core Network Gateway entity to said Mobile Core Network node.

A Femto Core Network Gateway entity according to the present invention may comprise:

means for concentrating a plurality of Mobile Network standard interfaces connecting a plurality of Femto-Cell Mobile Network entities to at least one Mobile Core Network node type.

A Femto Core Network Gateway entity according to the present invention may comprise:

means for performing admission control when performing said concentrating.

A Femto Core Network Gateway entity according to the present invention may comprise:

means for using information as to the type(s) of standard Mobile Network interface(s) connecting at least one Femto-Cell Mobile Network entity to at least one Mobile Core Network node type, via said Femto Core Network Gateway entity, when performing said concentrating.

Another aspect of the present invention is a Mobile Network entity of a Femto-Cell equipment, comprising:

means for connecting said Mobile Network entity to at least one Mobile Core Network node with at least one standard Mobile Network interface, via a Femto Core Network Gateway entity, said at least one standard Mobile Network interface being encapsulated in a secure tunnel established between said Femto-Cell and a Security Gateway of a Generic Access Network Controller, and being relayed by said Femto Core Network Gateway entity to said Mobile Core Network node.

Another aspect of the present invention is a Femto-Cell equipment, comprising:

means for providing to a Generic Access Network Controller, information as to the type(s) of standard Mobile Network interface(s) connecting at least one Mobile Network entity of said Femto-Cell equipment to at least one Mobile Core Network type.

A Femto-Cell equipment according to the present invention may comprise:

means for providing said information at the time of performing discovery and/or registration between said Femto Cell equipment and said Generic Access Network Controller.

A Femto Core Network Gateway entity according to the present invention may comprise:

means for providing said information in a message GA-RC-Register Request.

Another aspect of the present invention is a Generic Access Network Controller, comprising:

means for transferring to a Femto Cell equipment a transport address (e.g. IP address) of a Femto Core Network Gateway entity, at least one Mobile Network entity of said Femto-Cell equipment being connected to at least one Mobile Core Network node with at least one standard Mobile Network interface, via said Femto Core Network Gateway entity, said at least one standard Mobile Network interface being encapsulated in a secure tunnel established between said Femto-Cell equipment and a Security Gateway of a Generic Access Network Controller, and being relayed by said Femto Core Network Gateway entity to said Mobile Core Network node.

A Generic Access Network Controller according to the present invention may comprise:

means for sending said transport address to said Femto Cell equipment during a femto-cell GAN registration procedure.

A Generic Access Network Controller according to the present invention may comprise:

means for sending said transport address in a message GA-RC-Register Accept.

BRIEF DESCRIPTION OF THE DRAWINGS

These and other objects of the present invention will become more apparent from the following description taken in conjunction with the accompanying drawings:

FIG. 3 is intended to recall an example of protocol architecture for the GAN architecture recalled in FIG. 1, for example for PS domain User Plane, FIG. 4 is intended to illustrate an example of network architecture, according to the present invention, FIG. 5 is intended to illustrate an example of protocol architecture for an example of network architecture according to the present invention, for example for PS domain User Plane, for example when connecting a RNC entity of a Femto-Cell equipment to a SGSN node, with a Iu-ps interface, FIG. 6 is intended to illustrate an example of protocol architecture for an example of network architecture according to the present invention, for example for PS domain User Plane, for example when connecting a RNC entity of a Femto-Cell equipment to a SGSN node, with a Iu-ps interface, FIG. 7 is intended to illustrate an example of GAN registration procedure according to the present invention.

MORE DETAILED DESCRIPTION OF EMBODIMENTS OF THE INVENTION

Figure 1:
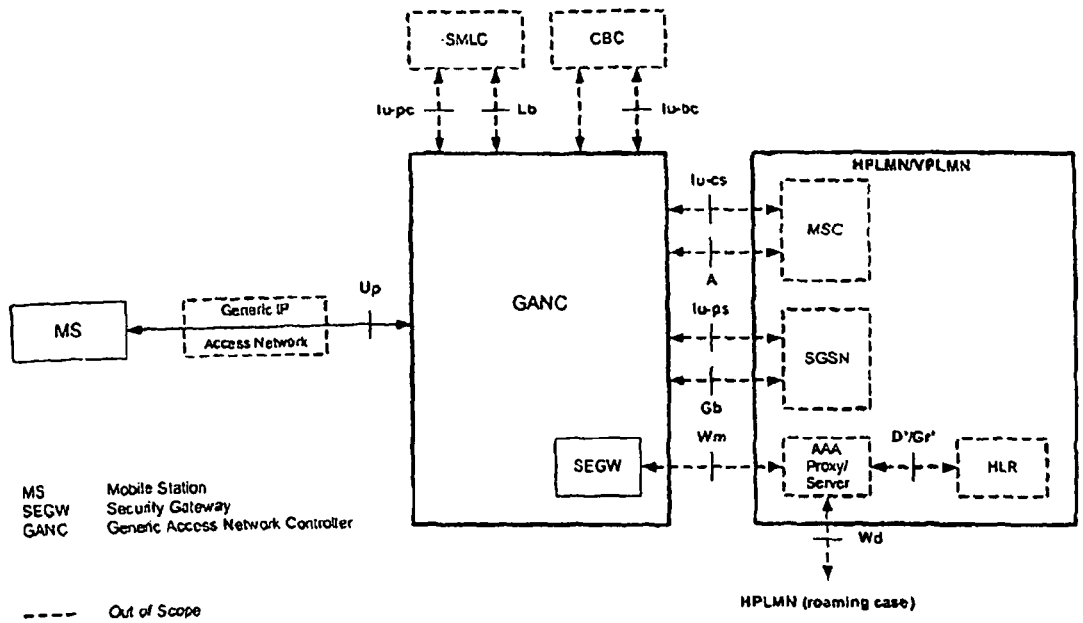
FIG. 1 is intended to recall "Iu-mode" GAN architecture.
Figure 2:
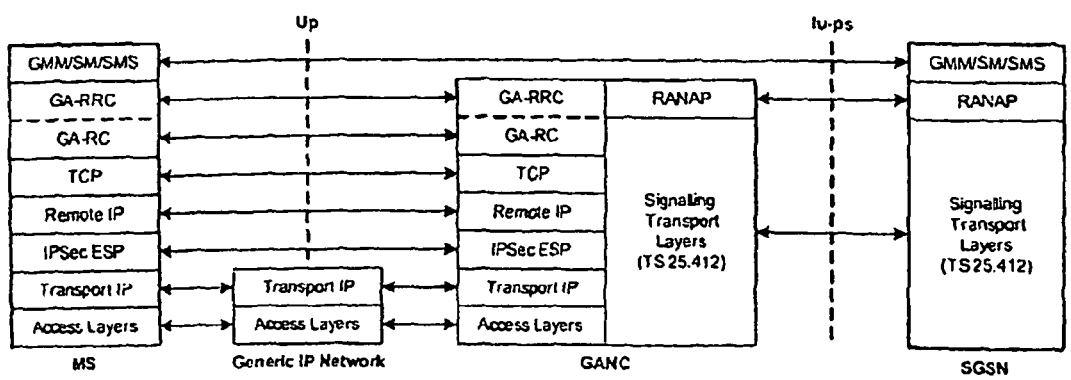
FIG. 2 is intended to recall an example of protocol architecture for the GAN architecture recalled in FIG. 1, for example for PS domain Control Plane.

The present invention proposes to take benefit of the commonalities between UMA/GA and Femto-Cell technologies to build a common architecture that is flexible enough to apply to various femto-cell architectures.

There are several femto-cell architectures, which may be optimized for different services; for example, a femto-cell equipment may consist in a NodeB plus a RNC function to be connected to a standard UMTS Core Network, or may also include a SGSN and a GGSN function for future full IMS services including Voice over IMS.

The proposed solution allows such flexibility as it is common for various femto-cell architectures.

There are mainly three kinds of femto-cells architectures:
NodeB-based femto-cells where the home device, connected through Public Internet, has NodeB functionality, and the RNC is located in the operator's network; One advantage of NodeB-based femto-cells is that it can use soft-handovers; however, frequency/code planning is complicated. Moreover, Iub interface is not fully identical from one vendor to the other, which is a real problem for a residential market with many femto-cells. It is seen as a strong assumption that the femto-cell interface to the network must be fully interoperable.
Iu-based femto-cells where the home device includes both NodeB and RNC functions; One advantage of this architecture is that it can be connected as a RAN to MSC and SGSN.
Gn/Gi-based femto-cells where the home device includes NodeB, RNC, SGSN and even GGSN functions. They can be interfaced via Iu-cs mainly for voice over CS as long as PS-CS VCC handovers are not implemented. Advantages of Gn/Gi femto-cells are that they by-pass SGSN and GGSN and that they are IMS-ready.

In the present invention, as in the above-recalled solution, the femto-cell is considered as a GAN subscriber that performs GAN discovery/registration procedures via Up interface standardised in 3GPP TS 43.318 and TS 44.318 while having no right to access the Core Network. The femto cell equipment includes a SIM or a USIM for its authentication and security. The femto-cell authentication is performed thanks to standard GAN procedures (EAP-SIM, EAP-AKA). At the end of authentication phase, an IPsec tunnel is setup between the Security Gateway of the GANC and the femto-cell as per TS 43.318.

However, the present invention has in particular following specificities:

a) The Up interface is only used by the femto-cell seen as a single subscriber.

b) The GANC provides the femto-cell with the address of the CN nodes via GANC registration.

c) The subscribers and the UEs are not required to be known by the GANC i.e. the GANC does not have UE contexts and does not perform any GAN function for individual UEs.

d) The GANC does not need interface with the CN:
The femto-cell is a GAN subscriber but not a CN subscriber: there is no need for CN access.
The interfaces related to UMTS subscribers (Iu-cs, Iu-ps, Gn, Gi, etc) are encapsulated in the IPsec tunnel established at femto-cell authentication, and relayed by the Security Gateway to the Core Network nodes.

e) In addition, as the number of femto-cells may be high, and depending on the functions included by the femto-cell equipment (NodeB, RNC, SGSN) it may be required to minimize the number of RNC's, or SGSN's seen by one Core Network node. For that purpose, there may be a "multiplexer/concentrator" (Femto Core Network Gateway) function and some transport layer adaptation e.g. between IP transport and ATM transport. The Femto Core Network Gateway function has two main goals:
Minimizing the number of nodes seen by the Core Network nodes. For example, if the femto-cell equipment consists in NodeB and RNC functions, and if there are N femto-cell equipment nodes, the MSC/SGSN nodes will see M RNCs where M<N.
Performing Admission Control. Admission Control consists in accepting/rejecting calls, session, etc. in order to avoid congestion on the multiplexed interfaces i.e. between the Femto Core Network Gateway and the Core Network nodes.

f) Finally, in order to be able to connect various types of femto-cell equipments (e.g. type 1=NodeB+RNC functions; type 2=NodeB+RNC+SGSN functions; type 3=NodeB+RNC+SGSN+GGSN functions; etc.), the femto-cell equipment may send its type to the GANC during GAN discovery and/or registration procedures or at any other time. The GANC may then relay this information to the Femto Core Network Gateway function that will adapt its function to the corresponding encapsulated interfaces (Iu, Gn, Gi, etc.). In addition, the "femto-cell Mobile Network entity type" can be a couple of sub-types: one type for CS domain, one type for PS domain. This enable to have a combined Iu-cs/Gn interfaced femto-cell equipment for example.

g) The transport address (e.g. IP address) of the Femto Core Network Gateway entity can be transferred by the GANC during the femto-cell equipment GAN registration procedure.

h) This can be extended to any kind of femto-cells such as CDMA2000 femto-cells, etc.

An example of system architecture according to the present invention is illustrated in FIG. 4.

In the example illustrated in FIG. 4, the system comprises:
MS/UE,
GAN,
Femto-Cell equipment,
Mobile Core Network.

In the example illustrated in FIG. 4, GAN comprises:
WLAN IP network,
GANC (including SEGW, and GANC Application Part performing registration and security-related GAN procedures),
Femto Core Network Gateway (noted MUX/CNT).

In the example illustrated in FIG. 4, Femto-Cell equipment comprises different Mobile Network entities including:
Node B,
RNC,
SGSN (optional in the illustrated example).

In the example illustrated in FIG. 4, Femto-Cell equipment also comprises Proxy GAN (performing registration and security-related GAN procedures).

In the example illustrated in FIG. 4, Mobile Core Network comprises different Mobile Core Network node types including, in the illustrated example:

MSC,
SGSN,
GGSN.

External networks connected to the illustrated Mobile Core Network nodes include, in this example: ISDN (connected to MSC), IMS and PDN (connected to GGSN).

Standard Mobile Network interface types connecting Femto-Cell Mobile Network entities to the Mobile Core Network include, in the illustrated example:

Iu interfaces connecting RNC to Mobile Core Network, including Iu-cs interface connecting RNC to MSC and Iu-ps interface connecting RNC to SGSN, Gn interface, connecting SGSN to GGSN.

In FIG. 4 there is illustrated a secure tunnel established between a Femto-Cell equipment and a Security Gateway SGW of a GANC. In the illustrated example, Femto cell Mobile Network entities RNC, SGSN are connected to Mobile Core Network nodes MSC, SGSN, GGSN with standard interfaces Iu (Iu-cs, Iu-ps), Gn, via a Femto Core Network Gateway entity (noted MUX/CNT), said standard interfaces being encapsulated in said secure tunnel, and being relayed by the Femto Core Network Gateway entity to the Mobile Core Network node.

FIG. 5 is intended to illustrate an example of protocol architecture for an example of network architecture according to the present invention, for example for PS domain User Plane, for example when connecting a RNC entity of a Femto-Cell equipment to a SGSN, with a Iu-ps interface.

FIG. 6 is intended to illustrate an example of protocol architecture for an example of network architecture according to the present invention, for example for PS domain User Plane, for example when connecting a RNC entity of a Femto-Cell equipment to a SGSN, with a Iu-ps interface.

In the example of FIGS. 5 and 6 the standard Mobile Network interface (Iu) is encapsulated in the secure tunnel established between a Femto-Cell equipment and the Security Gateway, and is relayed by the Femto Core Network Gateway entity to the Mobile Core Network node SGSN. The encapsulated interface is noted Iu/IPsec. The Iu/Ipsec interface connects the FemtoCell equipment to the Femto Core Network Gateway.

FIG. 7 is intended to illustrate an example of GAN registration procedure according to the present invention.

In the example of FIG. 7, there is illustrated in particular a step wherein the Femto-Cell equipment sends to GANC a message GA-RC-Register Request, said message including the Femto-Cell/Mobile Network entity type.

In the example illustrated in FIG. 7, there is also illustrated a step wherein the transport address (e.g. IP address) of the Femto Core Network Gateway entity is transferred by the GANC to the Femto Cell equipment during the femto-cell GAN registration procedure in a message GA-RC-Register Accept.

In addition to a method for interfacing a Femto-Cell equipment with a Mobile Core Network (for example a method as disclosed above) the present invention also has for its object various network entities comprising means for performing a method according to the present invention, such as in particular Generic Access Network Controller GANC, Femto-Cell equipment, Femto-Cell Mobile Network entity, Femto Core Network Gateway entity.

The detailed implementation of the above-mentioned means does not raise any special problem for a person skilled in the art, and therefore such means do not need to be more fully disclosed than has been made above, by their function, for a person skilled in the art.

The invention claimed is:

1. A method for interfacing a Femto-Cell equipment with a Mobile Core Network, said method comprising:

connecting at least one Mobile Network entity of said Femto-Cell equipment to at least one Mobile Core Network node through at least one standard Mobile Network interface, via a Femto Core Network Gateway entity, said at least one standard Mobile Network interface encapsulated in a secure tunnel established between said Femto-Cell equipment and a Security Gateway of a Generic Access Network Controller, and relayed by said Femto Core Network Gateway entity to said Mobile Core Network node.

2. The method of claim 1, wherein the connecting establishes said secure tunnel between said Femto-Cell equipment and said Security Gateway of said Generic Access Network Controller as a result of an authentication procedure performed between said Femto-Cell equipment and said Generic Access Network Controller.

3. The method of claim 1, further comprising:
performing discovery and registration between said Femto-Cell equipment and said Generic Access Network Controller.

4. The method of claim 1, further comprising:
providing, by said Generic Access Network Controller to said Femto-Cell equipment, at least one address of the Femto Core Network Gateway entity for connection by said at least one Femto-Cell Mobile Network entity.

5. The method of claim 4, wherein the providing provides said at least one address at the time of registering said Femto-Cell equipment with said Generic Access Network Controller.

6. The method of claim 1, further comprising:
concentrating, in said Femto Core Network Gateway entity, a plurality of Mobile Network standard interfaces connecting a plurality of Femto-Cell Mobile Network entities to at least one node of at least one Mobile Core Network node type.

7. The method of claim 6, wherein the concentrating performs admission control.

8. The method of claim 1, further comprising:
providing, by said Femto-Cell equipment to said Generic Access Network Controller, information as to an at least one type of at least one standard Mobile Network interface connecting said at least one Femto-Cell Mobile Network entity to at least one node of at least one Mobile Core Network node type.

9. The method of claim 8, wherein the providing provides said information at the time of discovery or registration performed between said Femto Cell equipment and said Generic Access Network Controller.

10. The method of claim 8, further comprising:
using said information when concentrating, in said Femto Core Network Gateway entity, a plurality of Mobile Network standard interfaces connecting a plurality of Femto-Cell Mobile Network entities to at least one Mobile Core Network node type.

11. The method of claim 1, wherein the standard network interface is at least one of the following interfaces: Iu-cs, Iu-ps, Gn, and Gi.

12. A Femto Core Network Gateway entity configured to connect at least one Mobile Network entity of a Femto-Cell equipment to at least one Mobile Core Network node through at least one standard Mobile Network interface, via said Femto Core Network Gateway entity, said at least one standard Mobile Network interface encapsulated in a secure tunnel established between said Femto-Cell equipment and a Security Gateway of a Generic Access Network Controller, and relayed by said Femto Core Network Gateway entity to said Mobile Core Network node.

13. The Femto Core Network Gateway entity of claim 12 further configured to concentrate a plurality of Mobile Network standard interfaces connecting a plurality of Femto-Cell Mobile Network entities to at least one node of at least one Mobile Core Network node type.

14. The Femto Core Network Gateway entity of claim 13 further configured to perform admission control when performing said concentrating.

15. The Femto Core Network Gateway entity of claim 13, further configured to use information as to an at least one type of at least one standard Mobile Network interface connecting at least one Femto-Cell Mobile Network entity to at least one Mobile Core Network node type, via said Femto Core Network Gateway entity, when performing said concentrating.

16. A Mobile Network entity of a Femto-Cell equipment-configured to connect said Mobile Network entity to at least one Mobile Core Network node through at least one standard Mobile Network interface, via a Femto Core Network Gateway entity, said at least one standard Mobile Network interface encapsulated in a secure tunnel established between said Femto-Cell and a Security Gateway of a Generic Access Network Controller, and relayed by said Femto Core Network Gateway entity to said Mobile Core Network node.

17. A Femto-Cell equipment configured to provide to a Generic Access Network Controller, information as to an at least one type of at least one standard Mobile Network interface through which at least one Mobile Network entity of said Femto-Cell equipment is connected to at least one Mobile Core Network type.

18. The Femto-Cell equipment of claim 17, further configured to provide said information at the time of performing discovery and/or registration between said Femto Cell equipment and said Generic Access Network Controller.

19. The Femto-Cell equipment of claim 18, further configured to provide said information in a message GA-RC-Register Request.

20. A Generic Access Network Controller configured to transfer to a Femto Cell equipment a transport address of a Femto Core Network Gateway entity, at least one Mobile Network entity of said Femto-Cell equipment connected to at least one Mobile Core Network node through at least one standard Mobile Network interface, via said Femto Core Network Gateway entity, said at least one standard Mobile Network interface encapsulated in a secure tunnel established between said Femto-Cell equipment and a Security Gateway of a Generic Access Network Controller, and relayed by said Femto Core Network Gateway entity to said Mobile Core Network node.

21. The Generic Access Network Controller of claim 20, further configured to send said transport address to said Femto Cell equipment during a femto-cell GAN registration procedure.

22. The Generic Access Network Controller of claim 21, further configured to send said transport address in a message GA-RC-Register Accept.

* * * * *